Aug. 18, 1953   E. R. WHEELER   2,649,020
SPECTACLE BAND
Filed April 26, 1950
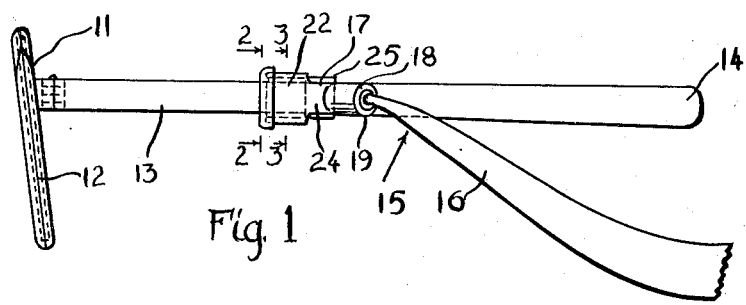
Fig. 1
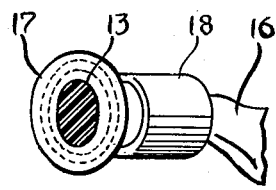
Fig. 2
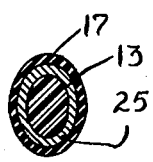
Fig. 3
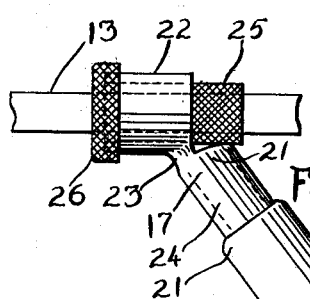
Fig. 4
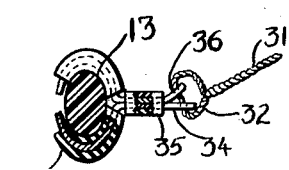
Fig. 5
Fig. 6
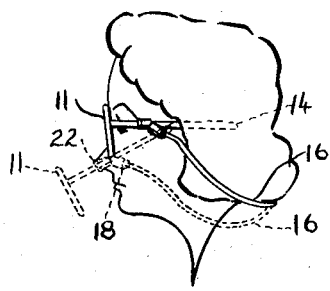
Fig. 7
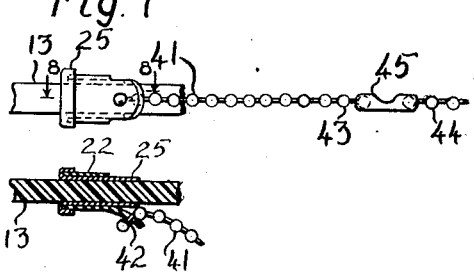
Fig. 8
Inventor
Ellen R. Wheeler
By
Attorney Patented Aug. 18, 1953

2,649,020

UNITED STATES PATENT OFFICE 2,649,020

SPECTACLE BAND

Ellen R. Wheeler, Fairfield, Conn.

Application April 26, 1950, Serial No. 158,116

7 Claims. (Cl. 88—51)

This invention relates to a retaining device for use with spectacles to permit their being removed from the eyes without having to lay them down and thereby misplace them or lose them. Such devices usually comprise a band connected to the spectacles and encircling the head or neck to support them when removed.

Heretofore, such devices have not been entirely satisfactory. For the most part they have required attachment to the spectacles at or near the ends of the temple bars adjacent the point where the bars engage the wearer's head and ears. As a result, such devices have interfered with properly positioning the bars on the ears and removing them therefrom, particularly in the case of women where their use seriously disarranges the hair. Also, attachment of the retaining device produces a protuberance which presses on the wearer's head with considerable discomfort.

An object of this invention is to provide an improved spectacle retaining device to encircle the back of a wearer's head or neck when connected to the temple bars of a pair of spectacles, constructed and arranged to permit the bars being repeatedly positioned on and removed from the wearer's ears without inconvenience and without disturbing or disarranging the hair.

A further object is to provide an improved spectacle retaining device arranged to leave the ends of the temple bars entirely unobstructed and free for application to and removal from the wearer's ears in the manner customary with spectacles.

A further object is to provide an improved retaining device for spectacles in which no part of the device presses on the wearer's head.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In the drawing:

Fig. 1 is a side elevation of a pair of spectacles provided with a retaining device constructed in accordance with one embodiment of the invention;

Figs. 2 and 3 are sections on the lines 2—2 and 3—3, respectively, of Fig. 1;

Fig. 4 is a plan view on an enlarged scale showing certain details of the embodiment illustrated in Fig. 1;

Fig. 5 is a partial sectional view similar to Fig. 2 showing a further embodiment of the invention;

Fig. 6 is a side elevation illustrating the freedom with which spectacles can be put on and removed without inconvenience when provided with a retaining device embodying the present invention;

Fig. 7 is a plan view showing a further embodiment, and

Fig. 8 is a section on the line 8—8 of Fig. 7.

For the purpose of illustration the present invention is shown in the drawing in connection with a pair of spectacles 11 having a lens frame 12 and hinged temple bars 13 which are shown as having straight ends 14, although the invention is equally useful and effective with those having curved ear-encircling ends, or ends of any other shape. The retaining device of this invention is adapted to be connected to the spectacle bars 13 and encircle the wearer's head or neck, so that the spectacles can be hung around the neck when not in actual use. It is provided with means for connecting it to the temple bars 13 of the spectacle frame 12, for example, in such a way that the ends of the bars can be placed on the ears or removed therefrom without disarranging the hair and as easily as though no retainer was connected to them. In the form shown in Figs. 1 to 4, a ribbon 16 is provided at each end with a connecting means adapted to be fastened to the bars 13 at a point between the ends thereof and preferably far enough forward thereon to avoid contact with the face of the wearer. As illustrated, a tubular socket member 17 of natural or synthetic material having a rubber-like resilience and elasticity is connected to each end of the ribbon 16 by any suitable connection such, for example, as a ferrule 18 having one end 19 thereof crimped or otherwise compressed around the ribbon 16 and the other end 21 similarly compressed into retaining engagement with the adjacent end of the socket member 17. The socket member 17 is formed with a slit 21 at one side, see Fig. 4, to provide a tubular bar-receiving body portion 22 open at both ends and connected by a hinge-forming section 23 to a supporting section 24 which is directly connected to the ferrule 18.

The tubular body portion 22 at each end of the ribbon 16 can be slipped over the end of one of the temple bars 13 and then advanced along the bar to a forward position, such as is shown in Fig. 1, in which the end of the bar is left entirely free from any obstruction so that it can be put on and taken off in the usual manner without disarranging the hair or other inconvenience.

When the socket member 17 and tubular body portion or section 22 are formed of a resilient material which grips the temple bars 13 in such a way as to make it difficult to slip the tubular body portion 22 along the bar to the desired forward position, a tubular liner 25 of a friction reducing material is provided and so mounted as to extend through the inside of the body portion 22 so as to reduce the friction sufficiently to allow the body portion 22 to be slipped more easily along the bars 13. The projecting end 26 of the liner at the front of the tubular portion 22 is illustrated as curled back around the edge of the body portion 22 and adhesively secured thereto. The opposite projecting end of the liner extends rearwardly far enough to form a finger grip for pulling the socket member off the temple bar 13 when it is desired to remove the device therefrom. While not essential, such a liner permits easier application of the retaining member to the temple bars. It can be formed, for example, of a textile material such as cotton, rayon or any other suitable friction reducing material, natural or synthetic.

In the embodiment of the invention shown in Fig. 5, the retaining member comprises a chain 31 of any suitable type connected by a link 32 to a pair of bar-gripping jaws formed by separate jaw members 33 each having outwardly extending arms 34 hinged together by a surrounding resilient sleeve 35 which holds the arms together and permits relative hinging movement of the jaws 32. One arm has an outwardly bent ear 36 adapted to be pressed toward the other arm 34 to open the jaws for application to or removal from a temple bar 13. As shown in Fig. 5, the jaws have a nonslip gripping face formed by a sleeve 37 or the like of an antifriction material, preferably having a rubber-like resilience and gripping quality.

A still further embodiment of the invention is shown in Fig. 7, in which a metallic retaining member in the form of a bead chain 41 is connected directly to the body section 22 of the socket member 17 by inserting the end bead of the chain through a hole 42 provided in an ear 24a formed on the tubular body portion 22 at the end thereof, the hole being small enough to prevent the enlargement at the end of the chain being pulled out by any stress to which it will be subjected in normal use, the resilience of the material serving to maintain the connection.

In the embodiment illustrated in Fig. 7, the retaining member 16a is formed in two sections 43, 44 which are detachably connected by a clasp 45 to permit the spectacles and the retaining member both being removed from the wearer's head when they are no longer to be used, without requiring them to be drawn over the head.

In use, each end of the retaining member 16 is connected to one of the temple bars 13 by slipping the tubular socket section 22 over the end 14 of the bar and then sliding it along the bar until it is located at a point where it will not engage the wearer's face and will leave the ends 14 of the bars entirely unobstructed, the resilience of the tubular body portion causing it to grip the temple bars and hold the parts in position. Different sizes of temple bars may require retaining members having different diameters of tubular body portions. As shown in Fig. 6, this permits the spectacles being freely put on or taken off in the normal manner by slipping the ends 14 of the bars back along the sides of the head without disarranging the hair, and without entangling the retaining device in the hair.

It will be apparent that the invention can be variously modified and adapted within the scope of the appended claims.

Having thus set forth the nature of my invention, I claim:

1. The combination in a retaining device for spectacles having temple bars, and including a flexible retaining member adapted to encircle the back of a wearer's head or neck, of separate fastening means at each end of said retaining member separately attachable to and detachable from one of said temple bars at a point between the ends thereof, whereby to leave the ends of said bars unobstructed for free application to and removal from the ears of a wearer, including a socket member of rubber-like elasticity having a tubular section open at both ends to slip over one of said temple bars and connect said retaining member thereto at a selected point longitudinally of said bar, a liner for said tubular section to facilitate movement thereof along said bar, said liner having a projecting end forming a grip for use in moving said tubular section along said bar, and means connecting said tubular section to an end of said retaining member.

2. The combination in a retaining device for spectacles having temple bars, and including a flexible retaining member adapted to encircle the back of a wearer's head or neck, of separate fastening means at each end of said retaining member separately attachable to and detachable from one of said temple bars at a point between the ends thereof, whereby to leave the ends of said bars unobstructed for free application to and removal from the ears of a wearer, including a socket member of rubber-like elasticity having a tubular section open at both ends to slip over one of said temple bars and connect said retaining member thereto at a selected point longitudinally of said bar, a liner for said tubular section to facilitate movement thereof along said bar, said liner having a projecting end forming a grip for use in moving said tubular section along said bar, the opposite end of said liner being secured to said socket, and means connecting said tubular section to an end of said retaining member.

3. The combination in a retaining device for spectacles having temple bars formed with head-engaging ends adapted to hold the spectacles in operative position on a wearer, of a flexible retaining member adapted to extend loosely around the back of a wearer's neck to permit a pair of spectacles attached thereto to be selectively worn in operative position or removed and suspended from the neck on said retaining member, means for securing each end of said retaining member to a temple bar comprising a securing member having a resilient tubular body section adapted to be slipped over said bar and positioned to grip said bar at a point spaced from the head-engaging end, a liner for said tubular body section of a friction-reducing material to facilitate movement thereof along the bar, said tubular section tending to contract because of its resiliency to clamp said lining about the bar, and means connecting each tubular body section to the associated end of said retaining member.

4. The combination in a retaining device for spectacles having temple bars formed with head-engaging ends adapted to hold the spectacles in operative position on a wearer, of a flexible retaining member adapted to extend loosely around the back of a wearer's neck to permit a pair of spectacles attached thereto to be selectively worn in operative position or removed and suspended from the neck on said retaining member, means for securing each end of said retaining member to said temple bars comprising a securing member having a resilient tubular body section adapted to be slipped over said bar and positioned to grip said bar at a point spaced from the head-engaging end, a liner for said tubular body section of a friction-reducing material to facilitate movement thereof along the bar, said tubular section tending to contract because of its resiliency to clamp said lining about the bar, and means connecting each tubular body section to the associated end of said retaining member including an opening formed in the resilient material of said body section, through which opening the end of the retaining member extends, and an enlargement at the end of the retaining member which is held by the resilience of the material forming said body section.

5. The combination in a retaining device for spectacles having temple bars formed with head-engaging ends adapted to hold the spectacles in operative position on a wearer, of a flexible retaining member adapted to extend loosely around the back of a wearer's neck to permit a pair of spectacles attached thereto to be selectively worn in operative position or removed and suspended from the neck on said retaining member, means for securing each end of said retaining member to said temple bars comprising a securing member having a flexible tubular body section adapted to be slipped over said bar and positioned to grip said bar at a point spaced from the head-engaging end, a liner for said tubular body section of a friction-reducing material to facilitate movement thereof along the bar, said tubular section tending to contract to clamp said liner about the bar, and means connecting each tubular body section to the associated end of said flexible retaining member including an ear on said body section having an opening formed therein, through which opening the end of the retaining member extends, and an enlargement at the end of the retaining member which is held by the resilience of the material forming said body section and ear.

6. The combination in a retaining device for spectacles having temple bars provided with head-engaging ends adapted to hold the spectacles in operative position on a wearer, of a flexible retaining member adapted to loosely encircle the back of a wearer's head or neck to permit a pair of spectacles attached thereto to be selectively worn in operative position or removed and suspended from the neck on said retaining member, separate fastening means at each end of said retaining member separately attachable to and detachable from one of said temple bars at a point spaced from the head-engaging end, including a tubular member of rubber-like elasticity, a liner for said tubular member of a friction-reducing material to facilitate movement thereof along the bar, said tubular member tending to contract to clamp said liner on the bar, and means connecting said tubular member to an end of said retaining member, said tubular member being open at both ends and adapted to be slid along one of said temple bars to said point to connect said retaining member thereto.

7. The combination in a retaining device for spectacles having temple bars provided with head-engaging ends adapted to hold the spectacles in operative position on a wearer, of a flexible retaining member adapted to loosely encircle the back of a wearer's head or neck to permit a pair of spectacles attached thereto to be selectively worn in operative position or removed and suspended from the neck on said retaining member, separate fastening means at each end of said retaining member separately attachable to and detachable from one of said temple bars at a point spaced from the head-engaging end including a tubular member of rubber-like elasticity, a liner for said tubular member of a friction-reducing material to facilitate movement thereof along the bar, said tubular member tending to contract to clamp said liner on the bar, and means connecting one side of said tubular member to an end of said retaining member, said tubular member being open at both ends and adapted to be slid along one of said temple bars to said point to connect said retaining member thereto.

ELLEN R. WHEELER.

References Cited in the file of this patent

UNITED STATES PATENTS

| Number | Name | Date |
|---|---|---|
| 1,819,738 | Daniels | Aug. 18, 1931 |
| 1,973,648 | Nagel | Sept. 11, 1934 |
| 2,023,523 | Grimball | Dec. 10, 1935 |
| 2,221,801 | Keppinger | Nov. 19, 1940 |
| 2,249,572 | Lieber | July 15, 1941 |
| 2,481,946 | Pendleton | Sept. 13, 1949 |
| 2,494,750 | Fornicoia | Jan. 17, 1950 |
| 2,499,140 | Griffith, Jr. | Feb. 28, 1950 |
| 2,541,493 | Barroso | Feb. 13, 1951 |

OTHER REFERENCES

The Optical Journal & Review of Optometry, vol. LXXXVI, October 15, 1949, page 21 (advertisement of Bishop), "Specgripper." (Photostatic copy of page 21 in Division 7.)